May 7, 1963 TSUNEYOSHI UYEMURA 3,088,365
ULTRA-HIGH-SPEED FRAMING CAMERA COMPRISING A COMBINATION
OF A ROTATING FILM DRUM AND A REFLECTING MIRROR
Filed Feb. 20, 1961 2 Sheets-Sheet 1
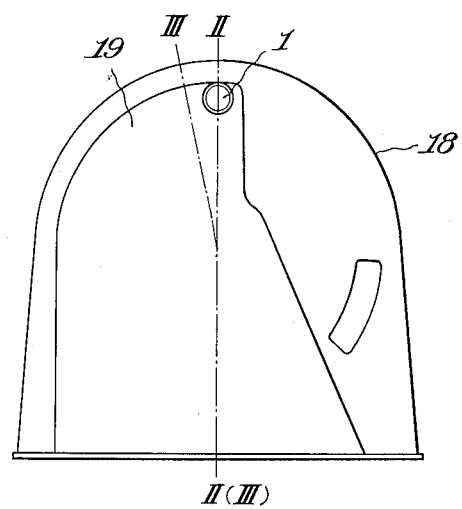
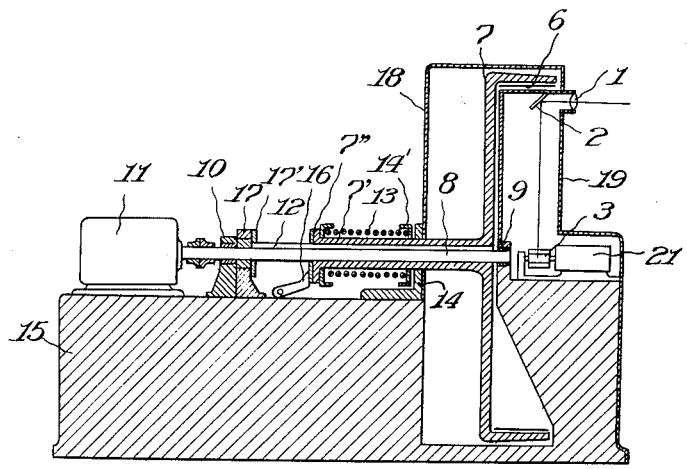

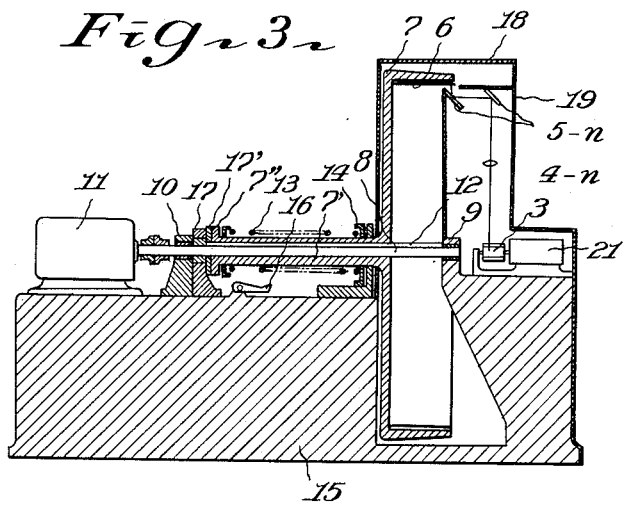
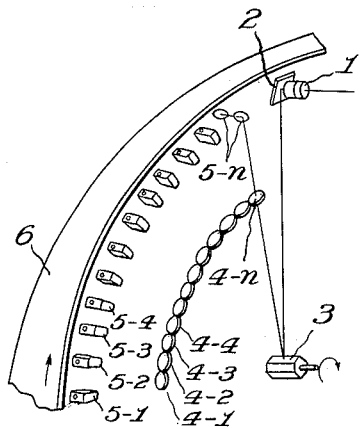
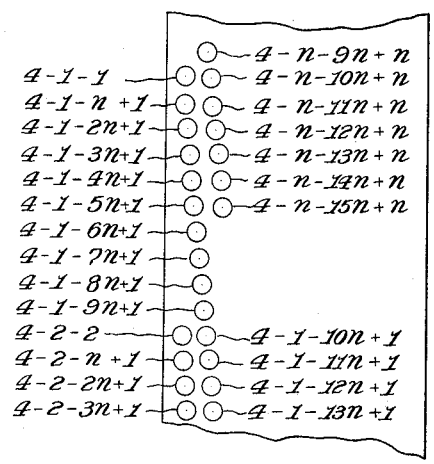

United States Patent Office 3,088,365
Patented May 7, 1963

3,088,365
ULTRA-HIGH-SPEED FRAMING CAMERA COMPRISING A COMBINATION OF A ROTATING FILM DRUM AND A REFLECTING MIRROR
Tsuneyoshi Uyemura, No. 340, 4-Chome Kitazawa, Setagaya-ku, Tokyo, Japan
Filed Feb. 20, 1961, Ser. No. 90,560
3 Claims. (Cl. 88—16)

This invention relates to ultra-high-speed photographic cameras, and more particularly it relates to a new ultra-high-speed framing camera apparatus comprising, in combination, an axially shiftable rotating film drum and a revolving, multi-facet reflecting mirror.

Heretofore, in a high-speed camera apparatus, it has been difficult to obtain effective photographic results by the mere use of high photographic speed. One of the most important aspects of the performance of such an apparatus is the interception and photographing, with good timing, of the object to be photographed without double reproduction of the development of the object and, at the same time, the continuous strip photographing of as large a number as possible of exposure frames.

It is an object of the present invention to provide a new ultra-high-speed framing camera apparatus which is capable of accomplishing the performance described above, and in which the number of exposure frames continuously photographed is substantially increased, such as for example, twice to several hundreds of times, over that of conventional cameras of similar type.

The above object, as well as other objects and advantages of this invention have been attained by the ultra-high-speed framing camera apparatus comprising, essentially, a rotating film drum and a multi-facet rotating reflector which are supported in substantially coaxial positions; a first lens system forming a first real image on or in the vicinity of the reflecting surface of the multi-facet reflector; and a large number of second relay lens systems which are arranged with suitable sequential spacing between said systems and said multi-facet reflector and film drum so as to project and photographically expose the second real images on the surface of a film placed on the inner surface of the film drum; and a driving device for rotating the multi-facet reflector as well as the film drum with a high speed so that the drum is made to move by an angle corresponding to one frame during the period in which a series of photographs is completed with a spacing corresponding to the arrangement of the relay lens systems so as to prevent mutual overlapping of the image photographed and the image photographed just prior to said former image as a result of the rotation of the film drum and multi-facet reflector.

According to the above-mentioned apparatus, it is possible to increase the number of exposure frames continuously strip photographed.

The above-mentioned apparatus of this invention can be modified so as to increase the advantages of this invention. Namely, according to this invention, it is possible to construct the film drum so that the film drum is adapted to rotate and move axially at the same time so as to prevent a second real image group being formed on the film of the drum from being overlappingly photographed as the multi-facet reflecting mirror rotates at high speed, whereby it is possible to greatly increase the number of exposure frames continuously strip photographed, that is, from twice to several hundreds of times.

The details of the invention will be more clearly apparent by reference to the following detailed description of a representative embodiment of the invention when taken in connection with the accompanying drawings, in which the same and equivalent parts are designated by the same reference numerals, and in which:

FIG. 1 is an elevational end view of an embodiment of the invention;
FIG. 2 is a sectional view taken along the line II—II of FIG. 1 showing the camera in condition for photographing;
FIG. 3 is a sectional view taken along the line III—III of FIG. 1 showing the camera at the completion of photographing;
FIG. 4 is a fragmental explanatory diagram, in perspective, showing the essential parts of the optical system of the embodiment; and
FIG. 5 is a fragmental view showing a portion of a film which has been exposed in photography by means of the embodiment.

Referring to the drawings, the essential parts of the optical system are: a first photographic lens system 1; a reflecting mirror 2; a multi-facet revolving reflector 3 of polyhedron shape; a second relay lens system consisting of a plurality of relay lenses 4–1, 4–2, 4–3, 4–4, . . . 4–$n$; a multi-facet reflector consisting of reflecting mirrors 5–1, 5–2, 5–3, 5–4, . . . 5–$n$; and a photographic film 6. The lenses 4–1, 4–2, 4–3, . . . 4–$n$ of any suitable number are arranged in fixed positions with suitable spacing on a circle which is concentric with the revolving reflector 3. Each of the reflecting mirrors 5–1, 5–2, 5–3, . . . 5–$n$ consists of a pair of reflecting surfaces as shown at 5–$n$ and is so disposed as to cause the image of the object being photographed from the multi-facet reflector 3 to be reflected and reach the photosensitive layer on the inner side of the film 6.

One complete cylinder of the film 6 is held by a cylindrical film drum 7 which is provided with an extended sleeve 7' and a flange 7" being provided at the end of the sleeve 7'. The film drum is supported on a drive shaft 8 passing through the sleeve 7' and is locked rotationally thereto by a feather key 12. The shaft 8 is supported by bearings 9 and 10 approximately coaxial to the multi-facet reflector 3 and is driven by a prime mover 11. The locking of the film drum 7 to the drive shaft 8 by the feature key 12 affords rotation of the drum and, at the same time, permits the film drum to move in the axial direction.

A spring 13 surrounds the sleeve 7' and bears at one end against the flange 7" and at the other end against another flange 14' supported by a spring retainer 14. The spring retainer 14 is so adapted that its position on base 15 of the apparatus can be adjusted, for example, by an axial slot in the retainer and a stop screw engaged in the slot to tighten the retainer on the base 15, so as to enable the setting of the precompression of the spring 13 and, consequently, of the velocity of motion in the axial direction of the film drum 7 to the required value. The spring 13 is compressed by moving the film drum 7 axially to the right as shown in FIG. 2, and the cocked state of the film drum 7 is locked by a pivoted catch 16 which acts on the outer face of the flange 7" against the force of the spring 13. At the time of photography, this catch 16 is tripped by a suitable device, that is, it is pulled downward so as to enable a leftward axial movement of the film drum 7. The inner and outer sides of the spring retainer 14, and the film drum flange 7" are provided with thrust bearings not shown clearly.

The termination of the axial movement of the film drum 7 is accomplished by a stop plate 17 and a suitable elastic material 17' is provided on the pressure-receiving face thereof.

A cover 18 is provided for the drum, and is joined to a cover 19 of the optical system at the end of the apparatus facing the object to be photographed, thereby providing an optically tight cover for the film. The apparatus is loaded with a film by opening an optically tight cover.

The rotating reflector 3 is driven by a high-speed means 21 such as an electric motor or a spring driving mechanism.

Referring to FIG. 5, the reference numerals and letters 4–1–1, 4–1–2n+1, ... 4–n–15n+n designate the numbers of the exposure frames which have been respectively photographed. The first two symbols 4–1, 4–n, ... etc., are serial numbers indicating the relay lenses which have participated in the photography of the exposure frames; and the subsequent symbols 1, 2n+1 ... 15n+n ... are serial numbers indicating the sequence of photography of the exposure frames.

The operation of the invention will be more clearly apparent by reference to the following detailed description. The light rays from the object being photographed enter the apparatus through the first photographic lens system 1, are reflected by the mirror 2, and form a first real image on the multi-facet reflector 3. This first real image is reflected towards the second relay lens system 4 and then through the reflecting mirrors 5 to form a second real image on the film 6 which has been placed inside the film drum 7. However, since the multi-facet reflector 3 is revolving at high speed during the photography, the light rays shift from the second relay lens system 4–1 to 4–2 and 4–3 and are projected as 4–1–1, 4–2–2, 4–3–3, ... etc., on the film 6 in sequence, with spacing in accordance with the arrangement of the second relay lens system. When the photographing of the image 4–n–n has been completed by the last second relay lens system 4–n, the next reflecting face of the multi-facet reflector 3 rotates into the light path of the rays entering through the first lens system and begins again through the second relay lens system 4–1, to form an image on the film. In the meanwhile, however, the film drum 7 has been previously caused to revolve, and its speed ratio is adjusted to such a ratio that exposure frames 4–1–n+1, 4–2n+2, ... etc., are photographed on unexposed portions of the film in positions which are displaced by the space of one exposure frame, respectively, from the exposure frames 4–1–1, 4–2–2, ..., photographed by the preceding reflecting surface so as not to produce overlapped exposures.

Then, as the photographing operation proceeds further with exposure frames 4–1–9n+1, 4–2–9n+2, ... 4–n–9n+n, the exposure frames to be photographed subsequently would overlap with the previously exposed frames 4–1–1, 4–2–2, ... etc., if it were not for the unique feature of the invention wherein the film drum is moved axially, simultaneously with its rotation. That is, the film drum 7 is moved axially as it continues to revolve by the spring 13 which has been compressed beforehand prior to the photographing operation and then released by the catch 16 at the start of the photographing operation. By adjusting this axial movement so that its value corresponds to the space of one exposure frame in the aforementioned space time, an unexposed portion of the film is brought into a position confronting the lenses and mirrors so as to enable the photographing of the frame 4–n–10n+n adjacent to the frame 4–1–1, 4–1–10n+1 adjacent to 4–2–2, and so on. In this manner, the photographing operation is continued over the entire effective surface of the film without mutual overlapping of the exposure frames.

It is a unique advantage of the invention that the use of a shutter for preventing double exposure in the photographic lens at the beginning and end of the photographing operation is not necessary. If the film drum were not moved axially, the photography would be limited to merely the exposure of an edge of the film, and the other portions of the film would not be exposed, even if the first lens system 1 was opened to place the apparatus in condition for photographing, and the multi-facet reflector 3 and film drum 7 were rotated.

The photographic speed and the number of continuously strip photographed exposure frames in the photography accomplished by means of the present invention can be adjusted over a wide range of values by suitably selecting such factors as the rotational speeds of the multi-facet reflector 3 and the film drum 7, the translational velocity of the film drum 7 in the axial direction, the number of second relay lens systems 4–1, 4–2, ... etc., and the size of the aperture. For example, by using an octahedron with sufficiently small mirror surfaces as the multi-facet reflector 3, rotating this reflector at a speed of 6,250 revolutions per second, and providing 20 second relay lens systems, a photographic speed up to one million exposure frames per second is obtainable. Then, if a photographic film of the size commonly designated as "120" is used, an effective exposure width of 50 millimetres and a single exposure frame size of 5 millimetres square is used, and 20 relay lens systems 4–1, 4–2, 4–3, ... 4–n are arranged at a mutual spacing which enables the exposure of 9 exposure frames, photography of 2,000 continuously strip photographed exposure frames with an exposure time of 1/500 seconds is possible at a film drum peripheral velocity of 250 metres per second and a velocity in the axial direction of 25 metres per second.

Furthermore, if the relay lenses 4–1, 4–2, 4–3, ... etc., or the mirrors 5, ... etc., are shut at suitable intervals, and the ratio between the rotational speed and velocity in the axial direction of the film drum is suitably selected, it will be possible to increase the number of continuously strip photographed exposure frames by that much. Moreover, in spite of the lowered photographic speed, it will be possible to accomplish photography at the same value of exposure time per exposure frame as that in the case of the aforesaid high photographic speed.

As one method of further increasing the number of continuously strip photographed exposure frames, a modification (not shown) may be made by providing a reflector with two reflecting surfaces which are slightly inclined apart and are in mutual contact between the photographic lens system and the multi-facet reflector, dividing thereby the image of the object being photographed, and reflecting the image to both the originally installed reflector system and a separately arranged relay lens system whereby the aforesaid number of exposure frames can be doubled over that in the case using a single-surface mirror.

As described above, photography by means of the present invention is accomplished as the drum, and consequently the film, is caused to undergo a helical motion. However, since it is possible to attach a diamond stop to the lenses and to reduce the exposure time per exposure frame to a fraction of a second and, further, up to approximately 1/10 second, it is possible to prevent blurred exposure of the image. Furthermore, by moving the first real image a suitable distance from the mirror surface of the multi-facet reflector, it is also possible to impart a suitable speed of motion to the first real image relative to the relay lenses, to cause the second real image to move the same amount as that of the film, to form a second real image which has the same velocity and the same direction of motion as the film, and thereby enable photography with correction for blurring due to the motion of the film.

By the use of the present invention wherein a combination of a drum system which undergoes a helical motion as afore-described and a rotating reflector system is utilized, it is possible not only to increase the number of photographed exposure frames by a phenomenal amount in comparison with the case of each of the systems utilized separately, but also to increase the number of continuously photographed exposure frames over a wide range. Furthermore, since the present invention has such unique features as being adapted to eliminate double exposures completely mechanically, the apparatus achieves a reliable operation capable of easily intercepting and photographing the object in spite of any transient phenomenon of the object varying in an infinitesimally short time, and can accomplish an exposure in a short exposure time regardless of the magnitude of the photographic speed thereby causing the production of a sharp photographic detail. Accordingly, the apparatus of the present invention is of great value in photographic research such as combustion, electric discharges, plastic and elastic deformations of materials, impact failure phenomenon, and nuclear fusion phenomenon.

Since it is obvious that changes and modifications can be made in the above described details without departing from the nature and spirit of the invention, it is to be understood that the invention is not to be limited to the details described herein except as set forth in the appended claims.

I claim:

1. An ultra-high speed framing camera comprising a rotatable film drum, a multi-facet rotatable reflector, means supporting the drum and reflector in substantially coaxial relationship, a sleeve arranged axially of the drum and supported for axial shifting movement, a first lens system for forming first real images adjacent the reflecting surface of the multi-facet reflector, a second relay lens system including a plurality of relay lenses, said last-named system being spacially arranged from the drum and reflector for projecting and exposing photographically second real images on the surface of a film positioned on the inner surface of the drum, drive means operably connected to the drum for rotating the drum, further drive means operably connected to the reflector for rotating the reflector, and means associated with said sleeve for shifting the drum axially, the arrangement being such that the drum moves axially corresponding to one frame during the period in which a series of photographs is completed with a spacing corresponding to the arrangement of the relay lens system or preventing mutual overlapping of the image photographed immediately prior to the former image as a result of the rotation of the drum and the reflector.

2. An ultra-high speed camera comprising a rotatable film drum, a multi-facet rotatable reflector, means mounting the drum for rotatable and axial movements, means supporting the multi-facet reflector in substantially coaxial relationship with respect to the drum, a first lens system for forming first real images adjacent the reflecting surface of the multi-facet reflector, a second relay lens system including a plurality fo relay lenses, said last-named system being spacially arranged from the drum and reflector for projecting and exposing photographically images on the surface of a film positioned on the inner surface of the drum, means operably connected to the drum for rotating the drum, means operably connected to the reflector for rotating the reflector at high speed and means associated with the drum for moving the drum axially during its rotation thereby preventing mutual overlapping of the second real images as a result of the high speed rotation of the multi-facet reflector whereby the number of continuously strip photographed exposure frames is considerably increased.

3. An ultra-high speed framing camera comprising a base, a rotatable film drum, a drive shaft for the film drum, bearing means on the base for the drive shaft, a prime mover coupled to the drive shaft for rotating the drive shaft, a sleeve arranged axially of and coupled to the drum and surrounding at least a portion of the drive shaft, means keying the shaft to the sleeve so that rotation of the shaft imparts rotation to the drum, a multi-facet rotatable reflector, means on the base rotatably mounting the reflector in substantially coaxial relationship to the drum, drive means operably coupled to the reflector for rotating the reflector at high speed, a spring surrounding the sleeve, abutment means on the sleeve for the opposite ends of the spring so that on axial movement of the sleeve towards the reflector the spring is compressed, movable catch means on the base engageable with the sleeve to maintain the spring compressed, said catch means being movable out of engagement with the sleeve so that the spring functions to move the sleeve and drum axially away from the reflector, a first lens system for forming first real images adjacent the reflecting surface of the multi-facet reflector, and a second relay lens system including a plurality of relay lenses with said last-named system being spacially arranged from the drum and the reflector for projecting and exposing photographically images on the surface of a film positioned on the inner surface of the drum, the arrangement being such that the axial movement of the drum during its rotation prevents mutual overlapping of the second real images as a result of the high-speed rotation of the multi-facet reflector whereby the number of continuously strip photographed exposure frames is considerably increased.

References Cited in the file of this patent

UNITED STATES PATENTS 2,968,990    Buck et al. _____ Jan. 24, 1961